Feb. 16, 1960 D. F. McFARLAND 2,924,984
TRANSMISSION
Filed April 3, 1959 3 Sheets-Sheet 1

Witness
Edward P. Seeley

Inventor
Douglas F. McFarland
by M. Talbert Dief
Attorney

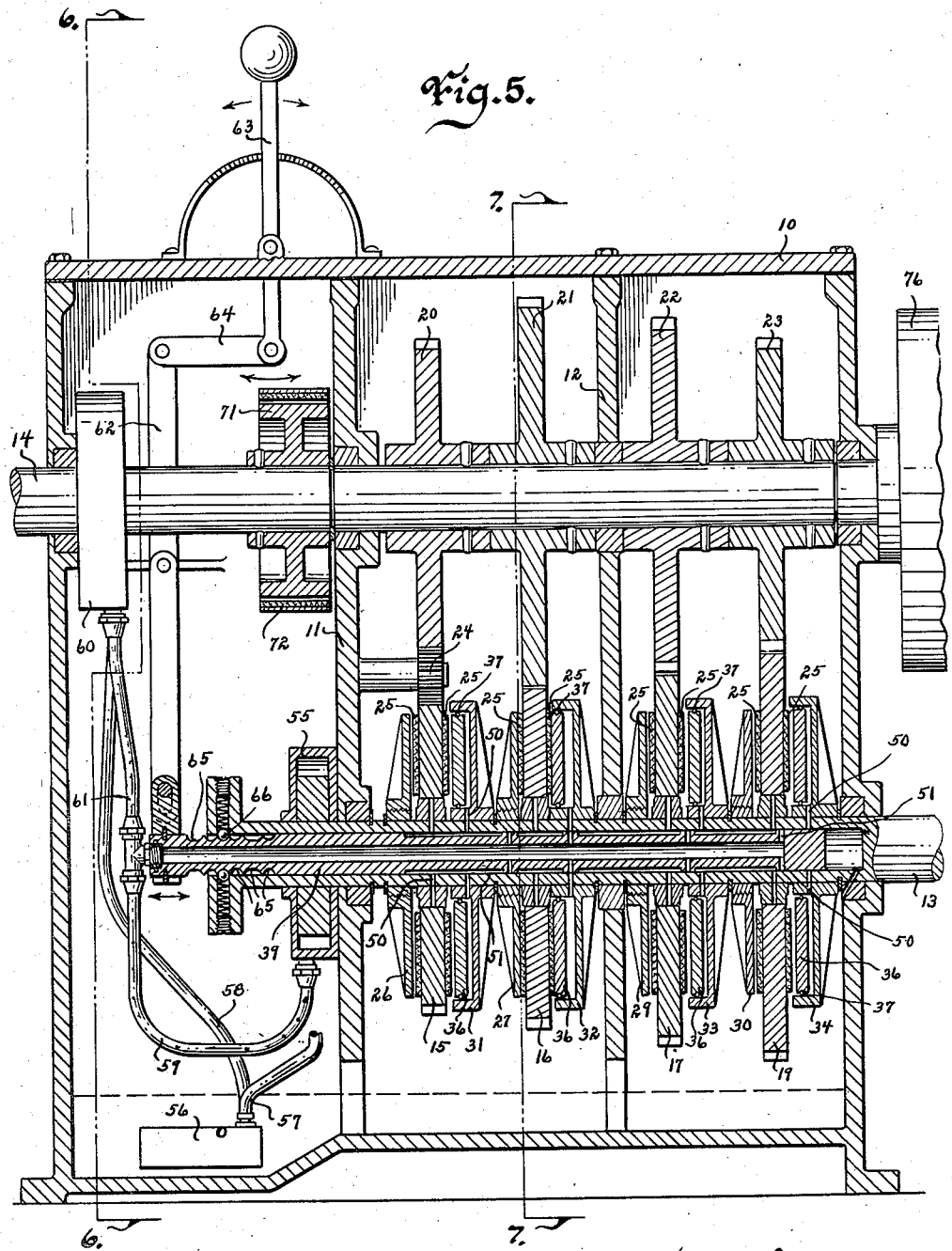

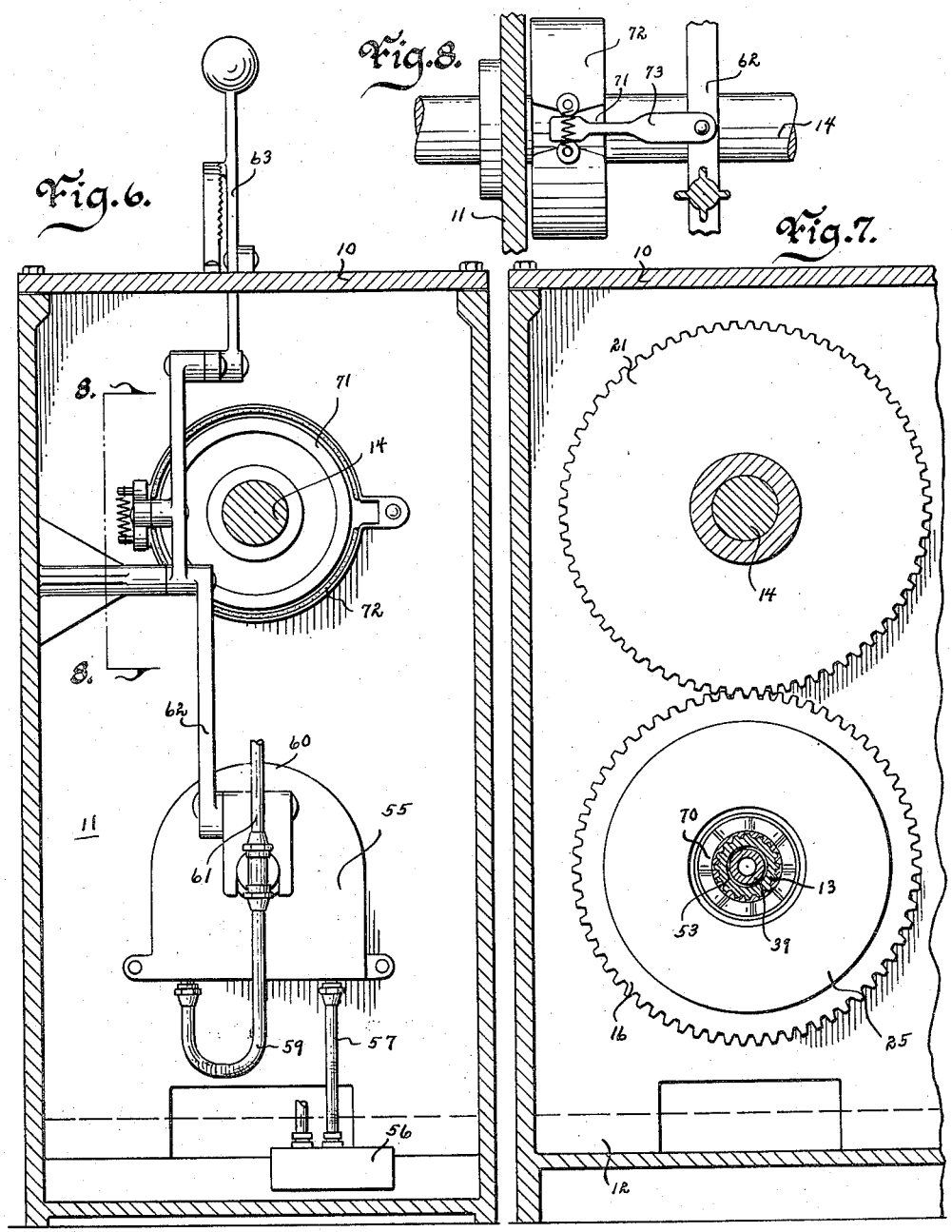

United States Patent Office 2,924,984
Patented Feb. 16, 1960

2,924,984

TRANSMISSION

Douglas F. McFarland, Davis City, Iowa

Application April 3, 1959, Serial No. 804,022

7 Claims. (Cl. 74—364)

This invention relates to multiple gear transmissions and more particularly to a transmission that is control actuated by hydraulic means.

Multiple speed transmissions are old and usually fall into the categories of "automatic," "semi-automatic" and "hand actuated." The transmission mechanism for effecting the gear change varies greatly. The most common, of course, is the selective employment of different sizes of gears relative to other gears. Usually it was necessary to employ a clutch to disengage the driven shaft during the gear changing phase. Obviously, all such transmissions are complicated and expensive. Many such transmissions do not have smooth power transmission during the shifting of the gears, and also have objectionable free wheeling action.

Therefore, one of the principal objects of my invention is to provide a hydraulically controlled multiple speed transmission.

A further object of this invention is to provide a multiple speed transmission that is smooth throughout its operation.

A still further object of this invention is to provide a transmission that has its own clutch means for each gear speed including reverse gear.

A still further object of this invention is to provide a semi-automatic transmission that is always under the complete control of the operator.

A still further object of this invention is to provide a transmission that has no loss of motion or power during the changing of gears and one that does not have objectionable free wheeling in any gear.

Still further objects of my invention are to provide a multiple gear transmission that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 5 is a vertical sectional view of my transmission taken on line 5—5 of Fig. 1, and more fully illustrates its construction;

Fig. 6 is a cross-sectional view of my device taken on line 6—6 of Fig. 5;

Fig. 7 is a cross-sectional view of my device taken on line 7—7 of Fig. 5; and

Fig. 8 is a side view of the brake means taken from line 8—8 of Fig. 6.

My transmission may be used for any purpose wherein a multigear transmission is needed. It is particularly adapted for motorized vehicles such as tractors, trucks, buses, track vehicles and automobiles.

Figure 1:
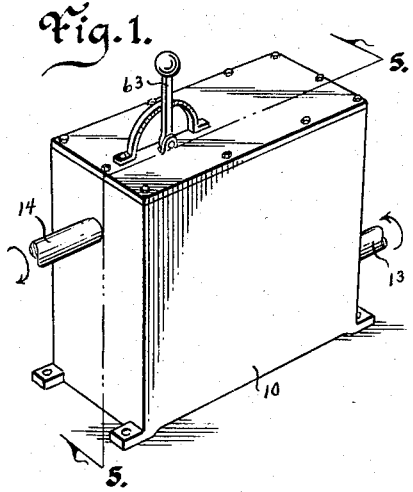
Fig. 1 is a perspective view of my transmission.
Figure 2:
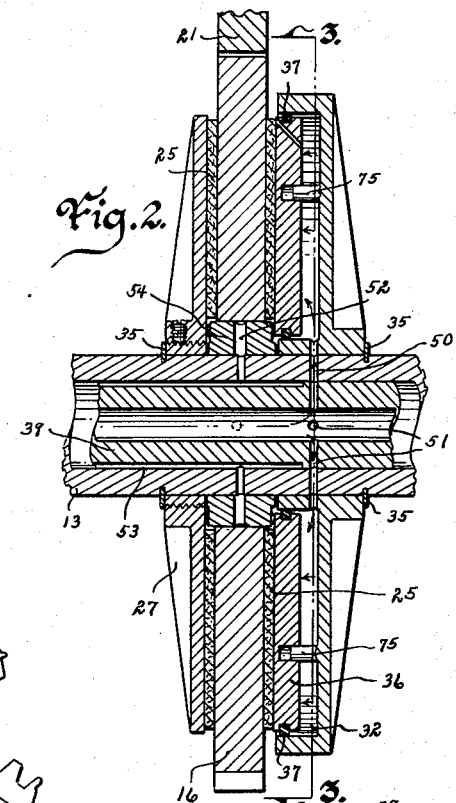
Fig. 2 is an enlarged vertical sectional view of one of the gear units of my multiple speed transmission in effective operation.
Figure 4:
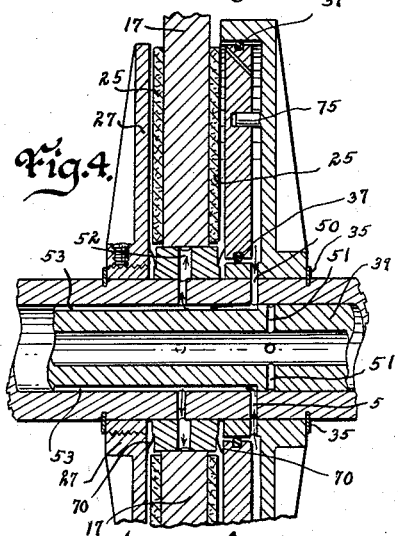
Fig. 4 is an enlarged sectional view of one of the gear units of my multiple speed transmission in a non-effective position.

In the drawings I have used the numeral 10 to designate the transmission housing. The numerals 11 and 12 designate two bearing walls in the housing. The numeral 13 designates the drive shaft rotatably extending into the housing and through the two bearing walls 11 and 12. This shaft is adapted to be operatively connected to a prime mover. The numeral 14 designates the driven shaft rotatably extending into the housing and through the bearing walls 11 and 12. This shaft 14 is spaced apart from and parallel with the shaft 13 as shown in the drawings. Rotatably secured on the shaft 13 and between the bearing walls 11 and 12 are two spaced apart plate gear wheels 15 and 16. Also rotatably secured on the shaft 13, but between the bearing wall 12 and the side wall of the housing are two spaced apart plate gear wheels 17 and 19. These gear wheels have peripheral gear teeth and the diameter of the gear wheel 17 is greater than that of the gear wheel 16, but less than that of the diameter of the gear wheel 19. The gear wheel 15 is the "reverse gear," the gear wheel 16, the "low gear," the gear wheel 17, the "intermediate gear" and the gear wheel 19, the "high gear." Any suitable number of gear speeds may be used employing my system. Rigidly secured on the shaft 14 are the gear wheels 20, 21, 22 and 23. The gear wheel 22 is of a diameter less than that of the gear wheel 21, but greater than that of the gear wheel 23. The numeral 24 designates an "idler gear" operatively rotatably mounted on the bearing wall 11, and having its peripheral teeth in mesh with the peripheral teeth of both the gear wheels 15 and 20. Thus, when the gear wheel 15 is power driven, the gear wheel 20 will be caused to rotate in the same direction of rotation and a reverse gear will be realized. The relatively large gear wheel 21 has its peripheral teeth in mesh with the peripheral teeth of the relatively small gear wheel 16 and when the gear wheel 16 is power driven, the shaft 13 will have a speed rotation greater than that of the shaft 14 and "low" gear will be realized. The gear wheel 22 has its peripheral teeth in mesh with the peripheral teeth of the gear wheel 17, and when the gear wheel 17 is power driven, "intermediate" gear will be realized. The relatively small diameter gear wheel 23 has its peripheral teeth in mesh with the relatively large diameter gear wheel 19 and when the gear wheel 19 is power driven, "high" gear will be realized. The operation of all these gear wheels relative to each other is well known and my invention chiefly resides in the means of selectively securing each of the gear wheels 15, 16, 17 and 19 to the shaft 13 against independent rotation. On each side of each of the gear wheels 15, 16, 17 and 19 I secure a friction plate 25. These friction plates may be of any suitable material such as that of clutch face liners. Rigidly secured to the shaft 13 and adjacent the left side of the gear wheel 15 is a rigid plate 26. A similar rigid plate 27 rigidly secured to the shaft 13 is adjacent the left side of the gear wheel 16. Also a rigid plate 29 is rigidly secured to the shaft 13 and adjacent the left side of the gear wheel 17. The numeral 30 designates a rigid plate rigidly secured to the shaft 13 and adjacent the left side of the gear wheel 19. These rigid plates are longitudinally adjustable on the shaft 13 by having threaded collars and set screws as shown in Fig. 2 and Fig. 4. On the shaft 13 and to the right side of the gear wheel 15 is a cup 31 facing the gear wheel. A similar cup 32 is at the right side of the gear wheel 16, a similar cup 33 is at the right side of the gear wheel 17, and a similar cup 34 is at the right side of the gear wheel 19. Each of these cup members faces its adjacent gear wheel and each pair of rigid plate members and cups is held from spreading away from each other by snap rings 35 as shown in Fig. 2. In each cup member is a slidable circular open centered disk 36 having an O-ring 37 embracing its outer periphery and an O-ring 37 embracing its inner periphery and engaging the circular walls of its cup as shown in Fig. 4. That part of the shaft 13 that extends into the housing 10 is hollow and slidably extending into the shaft 13 is a hollow shaft 39. Each of the gear wheel units, as to operation, is a substantial duplicate and by referring to Figs. 2 and 4 the operation of each of the units will be apparent. Extending through the base of each cup and the wall of the hollow shaft 13 are a plurality of passageways 50. These passageways communicate with the inside of the cup and back of its circular disk 36. Extending through the wall of the hollow shaft 39 are four spaced apart sets of passageways 51. These sets of spaced apart passageways are so arranged that when the hollow shaft 39 is longitudinally slid to its maximum movement into the shaft 13, one set of these passageways will communicate with the passageways 50 that communicate with the inside of the cup 34. When the shaft 39 is slid outwardly relative to the shaft 13 to its next position, a set of passageways 51 will be in communication with the passageways 50 that are in communication with the inside of the cup 33. A further outward sliding of the shaft 39 brings another set of passageways 51 in communication with the passageway 50 that communicates with the inside of the cup 32. A still further sliding withdrawal of the pipe 39 brings another set of passageways 51 into communication with the passageways 50 that communicate with the inside of the cup 31. The sets of passageways 51 are so arranged and spaced that only one set at a time can operatively communicate with the inside of a cup. Each of the gear wheels 15, 16, 17 and 19 may rotate around a bearing ring 54 on the shaft 13. These bearing rings 54 are positioned between the adjacent rigid plate and adjacent cup. The numeral 52 designates passageways through each of these bearing rings and wall of the hollow shaft 13. Around the hollow shaft 39 are four spaced apart reduced areas to provide an elongated longitudinal passageway 53 between the periphery of the hollow shaft 39 and the inside bore of the hollow shaft 13. These four longitudinal passageways 53 are so arranged and positioned that none is capable of communicating with a given set of passageways 50 and 52 when the given set of passageways 52 is in communication with a set of passageways 51. Thus, after a gear wheel unit has had its cup furnished with a fluid pressure, and then another gear wheel unit is employed, the fluid pressure in the cup of the first unit may exit back through the passageways 50, thence through the adjacent passageway 53, thence through the passageways 52 and then seep back into the system. The numeral 55 designates a fluid pump having its rotor rigidly secured to the shaft 39 and its housing secured to the bearing wall 11. The numeral 56 designates a hydraulic fluid tank sump in the bottom area of the housing 10. The numeral 57 designates a conduit leading from the tank 56 to the inlet side of the fluid pump. The numeral 59 designates a flexible conduit leading from the outlet side of the fluid pump to the inside of the hollow shaft 39 by a slip connection as shown in Fig. 5. The numeral 60 designates a similar pump secured to the housing and connected to the shaft 14, having its flexible conduit 61 likewise communicating with the inside of the hollow shaft 39. This pump 60 has a conduit 58 leading from the sump 56 to its inlet port.

Any suitable means may be used for changing the gear ratio or placing the device in reverse by slidably moving the hollow shaft 39 in order to bring the passageways 51 into the selected passageways 50. In the drawings I show a bar 62 pivoted near its center length to the housing 10 and having its lower end slidably pivoted to the outer end of the hollow shaft. The numeral 63 designates a hand lever pivoted between its two ends to the housing with its upper end above the housing and its lower end extending into the housing. The numeral 64 designates a link having one end pivoted to the lower end of the lever 63 and its other end pivoted to the other end of the bar 62. By this arrangement of parts the hand lever will selectively position the hollow shaft 39 in the hollow shaft 13. Any suitable position of gear arrangement may be had, i.e., if desired the neutral position may be before or after "reverse" position by merely rearranging the position of the various passageways 50 and 51. Any suitable position indicating means and shaft 13 yielding holding means may be used. In the drawings I use a series of circular grooves 65 around the shaft 39 and which are selectively engaged by spring loaded pawls 66.

When the shaft 39 is positioned as shown in Fig. 5, the pump will be furnishing fluid pressure through the hollow shaft 39 through the passageways 51, through the passageways 50 and into the cup 32. This hydraulic pressure will move the disk 36 of that cup to the left and thereby wedge the gear wheel 16 and its friction side plates between the disk and adjacent rigid plate 27. Because of the relative sizes of the two gear wheels 16 and 21, the transmission will be in "low" gear. If the shaft is moved to the right into the next notch, passageways 50 and 51 will communicate with the inside of the cup 37 and the gear wheel 17 will thereby be locked to the shaft 13 and "intermediate" gear will result. By moving the shaft 39 to the right of the next notch, hydraulic fluid pressure will be passed into the cup 34 and "high" gear will result. If the shaft 39 is moved to the left beyond the "low" gear notch, the transmission will be in "neutral" or "park" and if moved further to the left to the next notch the hydraulic pressure will enter the cup 31 and "reverse" gear will result. When hydraulic pressure is denied to any one of the cups, that cup will move away from its adjacent rigid plate by the spring washers 70. When the transmission is in neutral it may be desirable to brake the shaft 14. I show a brake wheel 71 on the shaft 14 embraced by a movable brake band 72. A brake band actuating lever 73 extends from the brake band to the bar. If the hydraulic pump should fail, the hand pump 60 may be used in case of an emergency.

Figure 3:
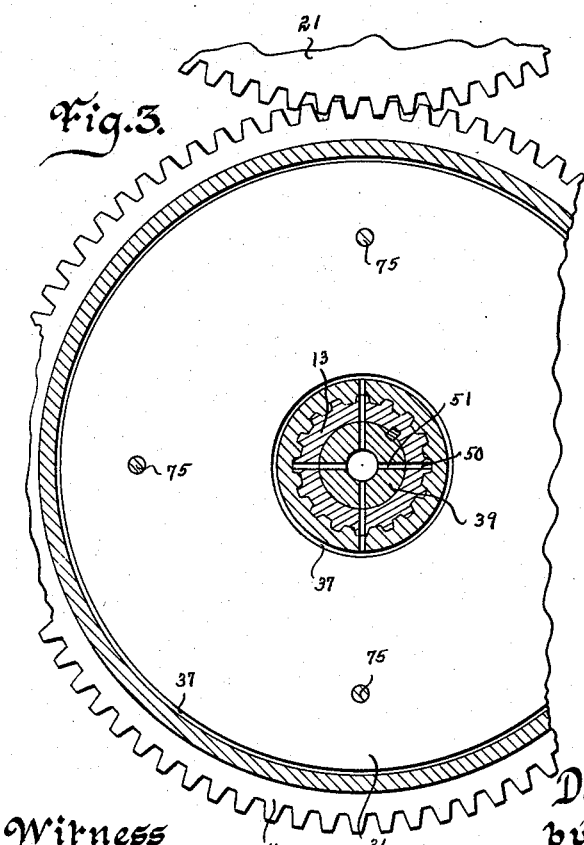
Fig. 3 is an enlarged cross-sectional view of the unit shown in Fig. 2 and is taken on line 3—3 of that figure.

The disk plungers 36 should be held against independent rotation relative to the cup members in which they function. In the drawings I show holding lugs 75 in the cup members and which slidably extend into the respective disks 36. Inasmuch as the plunger disks 36 must be substantially tight relative to the inner and outer wall of the cup members in which they function, they should be provided with the O-rings 37 both at their outer periphery and inner periphery as shown in Fig. 4. The cup members may be held by any suitable means against independent rotation relative to the shaft 13 and in the drawings I accomplish this by splining the cup members on the shaft 13 as shown in Fig. 3.

One advantage of my transmission structure is that so many of the various parts are interchangeable, thereby facilitating repairs and repair costs. Under some conditions it will be desirable to have a fly wheel 76 on the shaft 14, to carry the parts in continuing motion during the gear shifting time interval. The hydraulic actuation, however, is most rapid, and the transmission will not permit undesirable free wheeling.

From the foregoing it will be apparent that to place the transmission in any desired position, it is merely necessary to selectively valve the hydraulic pressure fluid into the appropriate cup by use of the hand lever.

Some changes may be made in the construction and arrangement of my transmission without departing from the real spirit and purpose of my invention, and it is my intention to cover by my claims, any modified forms of structure or use of mechanical equivalents which may be reasonably included within their scope.

I claim:

1. In a transmission, a housing, a drive shaft rotatably mounted in said housing, a driven shaft rotatably mounted in said housing, a plurality of gear wheels of different dimensions rotatably mounted on said drive shaft, a means at one side of each of said gear wheels for limiting the sliding movement of said gear wheels in that direction, a cup member on the other side of each of said gear wheels, a disk plunger slidably mounted in each of said cup members and capable of being moved into engagement with the gear wheel adjacent to it, a plurality of gear wheels of different diameters secured to said driven shaft and operatively in engagement with said plurality of gear wheels on said drive shaft, respectively, and a means for selectively furnishing hydraulic fluid pressure to each of said cup members.

2. In a transmission, a housing, a drive shaft rotatably mounted in said housing, a driven shaft rotatably mounted in said housing, a plurality of gear wheels of different dimensions rotatably mounted on said drive shaft, a means at one side of each of said gear wheels for limiting the sliding movement of said gear wheels in that direction, a cup member on the other side of each of said gear wheels, a disk plunger slidably mounted in each of said cup members and capable of being moved into engagement with the gear wheel adjacent to it, a plurality of gear wheels of different diameters secured to said driven shaft and operatively in engagement with said plurality of gear wheels on said drive shaft, respectively; said drive shaft having a bore, a hollow shaft slidably adjustably mounted in the bore of said drive shaft, passageways extending through the wall of said drive shaft communicating with the inside of said cup members, respectively, passageways extending through the wall of said hollow slidable shaft capable of selectively communicating with the passageways in said drive shaft, respectively, a means for slidably moving said slidable hollow shaft in said drive shaft, and a means for furnishing fluid pressure to the inside of said slidable hollow shaft.

3. In a transmission, a housing, a drive shaft rotatably mounted in said housing, a driven shaft rotatably mounted in said housing, a plurality of gear wheels of different dimensions rotatably mounted on said drive shaft, a means at one side of each said gear wheels for limiting the sliding movement of said gear wheels in that direction, a cup member on the other side of each of said gear wheels, a disk plunger slidably mounted in each of said cup members and capable of being moved into engagement with the gear wheel adjacent to it, a plurality of gear wheels of different diameters secured to said driven shaft and operatively in engagement with said plurality of gear wheels on said drive shaft, respectively; said drive shaft having a bore, a hollow shaft slidably adjustably mounted in the bore of said drive shaft, passageways extending through the wall of said drive shaft communicating with the inside of said cup members, respectively, passageways extending through the wall of said hollow slidable shaft capable of selectively communicating with the passageways in said drive shaft, respectively, a means for slidably moving said slidable hollow shaft in said drive shaft, friction plates on each side of each of said gear wheels on said drive shaft, and a means for furnishing fluid pressure to the inside of said slidable hollow shaft.

4. In a transmission, a housing, a drive shaft rotatably mounted in said housing, a driven shaft rotatably mounted in said housing, a plurality of gear wheels of different dimensions rotatably mounted on said drive shaft, a means at one side of each of said gear wheels for limiting the sliding movement of said gear wheels in that direction, a cup member on the other side of each of said gear wheels, a disk plunger slidably mounted in each of said cup members and capable of being moved into engagement with the gear wheel adjacent to it, a plurality of gear wheels of different diameters secured to said driven shaft and operatively in engagement with said plurality of gear wheels on said drive shaft, respectively; said drive shaft having a bore, a hollow shaft slidably adjustably mounted in the bore of said drive shaft, passageways extending through the wall of said drive shaft communicating with the inside of said cup members, respectively, passageways extending through the wall of said hollow slidable shaft capable of selectively communicating with the passageways in said drive shaft, respectively, a means for slidably moving said slidable hollow shaft in said drive shaft, a means for draining fluid pressure from each of said cup members when they are not in operative communication with the inside of said slidable hollow shaft, and a means for furnishing fluid pressure to the inside of said slidable hollow shaft.

5. In a transmission, a housing, a drive shaft rotatably mounted in said housing, a driven shaft rotatably mounted in said housing, a plurality of gear wheels of different dimensions rotatably mounted on said drive shaft, a means at one side of each of said gear wheels for limiting the sliding movement of said gear wheels in that direction, a cup member on the other side of each of said gear wheels, a disk plunger slidably mounted in each of said cup members and capable of being moved into engagement with the gear wheel adjacent to it, a plurality of gear wheels of different diameters secured to said driven shaft and operatively in engagement with said plurality of gear wheels on said drive shaft, respectively; said drive shaft having a bore, a hollow shaft slidably adjustably mounted in the bore of said drive shaft, passageways extending through the wall of said drive shaft communicating with the inside of said cup members, respectively, passageways extending through the wall of said hollow slidable shaft capable of selectively communicating with the passageways in said drive shaft, respectively, a means for slidably moving said slidable hollow shaft in said drive shaft, and a fluid pump operatively connected to said drive shaft and in operative communication with the inside of said slidable hollow shaft.

6. In a transmission, a housing, a drive shaft rotatably mounted in said housing, a driven shaft rotatably mounted in said housing, a plurality of gear wheels of different dimensions rotatably mounted on said drive shaft, a means at one side of each of said gear wheels for limiting the sliding movement of said gear wheels in that direction, a cup member on the other side of each of said gear wheels, a disk plunger slidably mounted in each of said cup members and capable of being moved into engagement with the gear wheel adjacent to it, a plurality of gear wheels of different diameters secured to said driven shaft and operatively in engagement with said plurality of gear wheels on said drive shaft, respectively; said drive shaft having a bore, a hollow shaft slidably adjustably mounted in the bore of said drive shaft, passageways extending through the wall of said drive shaft communicating with the inside of said cup members, respectively, passageways extending through the wall of said hollow slidable shaft capable of selectively communicating with the passageways in said drive shaft, respectively, a means for slidably moving said slidable hollow shaft in said drive shaft, a lever means for facilitating the slidable movement of said slidable shaft, and a fluid pump operatively connected to said drive shaft and in operative communication with the inside of said slidable hollow shaft.

7. In a transmission, a housing, a drive shaft rotatably mounted in said housing, a driven shaft rotatably mounted in said housing, a plurality of gear wheels of different dimensions rotatably mounted on said drive shaft, a rigid plate rigidly secured to the said drive shaft at one side of each of said gear wheels for limiting the sliding movement of said gear wheels in that direction, a hydraulic pressure actuated unit having a movable member on the other side of each of said gear wheels and each of said members of said unit capable of frictionably engaging the gear wheels adjacent to it when actuated, a means for selectively furnishing hydraulic fluid pressure to each of said hydraulic pressure actuated units, and a plurality of gear wheels of diffferent diameters on said driven shaft and in mesh with said plurality of gear wheels on said drive shaft, respectively; said gear wheels on said drive shaft each having side friction plates engageable by the adjacent rigid plate and adjacent movable member.

References Cited in the file of this patent
UNITED STATES PATENTS

| | | |
|---|---|---|
| 796,990 | Enrico | Aug. 15, 1905 |
| 2,825,234 | Papst | Mar. 4, 1958 |
| 2,849,887 | Knowles | Sept. 2, 1958 |